United States Patent
Lohrey et al.

(10) Patent No.: US 10,237,128 B2
(45) Date of Patent: Mar. 19, 2019

(54) METHOD FOR THE INSTALLATION WITH AN ELECTRONIC DEVICE OF AN OUTDOOR UNIT AND ELECTRONIC DEVICE FOR SUCH AN INSTALLATION

(71) Applicant: EUTELSAT S A, Paris (FR)

(72) Inventors: Thomas Lohrey, Magny les Hameaux (FR); Jérôme Ichard, Paris (FR); Simon Gray, Bièvres (FR)

(73) Assignee: EUTELSAT S A, Paris (FR)

( * ) Notice: Subject to any disclaimer, the term of this patent is extended or adjusted under 35 U.S.C. 154(b) by 65 days.

(21) Appl. No.: 14/737,775

(22) Filed: Jun. 12, 2015

(65) Prior Publication Data

US 2015/0365280 A1  Dec. 17, 2015

(30) Foreign Application Priority Data

Jun. 13, 2014  (EP) .................................... 14 172444

(51) Int. Cl.
| | |
|---|---|
| *H04L 12/24* | (2006.01) |
| *G08C 17/00* | (2006.01) |
| *H01Q 1/12* | (2006.01) |
| *H04W 4/02* | (2018.01) |
| *H04W 24/10* | (2009.01) |
| *H04W 64/00* | (2009.01) |

(52) U.S. Cl.
CPC .......... *H04L 41/0806* (2013.01); *G08C 17/00* (2013.01); *H01Q 1/1257* (2013.01); *H04W 4/02* (2013.01); *H04W 24/10* (2013.01); *H04W 64/003* (2013.01); *G08C 2201/20* (2013.01)

(58) Field of Classification Search
CPC .. G08C 17/00; G08C 2201/20; H01Q 1/1257; H04L 41/0806; H04W 24/10; H04W 4/02; H04W 64/003
See application file for complete search history.

(56) References Cited

U.S. PATENT DOCUMENTS

| | | | |
|---|---|---|---|
| 6,216,266 B1 * | 4/2001 | Eastman | H04N 5/44513 348/570 |
| 6,509,934 B1 * | 1/2003 | Bao | H01Q 1/1257 342/359 |
| 2002/0032028 A1 * | 3/2002 | Kaupe | H04B 7/18519 455/427 |
| 2005/0046614 A1 * | 3/2005 | Akano | G01S 5/0036 342/357.23 |
| 2006/0235611 A1 | 10/2006 | Deaton et al. | |
| 2007/0043811 A1 * | 2/2007 | Kim | G06Q 10/06 709/203 |

(Continued)

OTHER PUBLICATIONS

Extended Search Report as issued in European Patent Application No. 14172444.3, dated Dec. 4, 2014.

*Primary Examiner* — Steven H Nguyen

(74) *Attorney, Agent, or Firm* — Pillsbury Winthrop Shaw Pittman, LLP

(57) ABSTRACT

A method for installing an outdoor unit, the outdoor unit for receiving signals from a satellite, the method including determining, with an electronic device, pointing information to be applied to the outdoor unit; receiving signal quality information on the electronic device and from an indoor unit, the indoor unit including a modem or receiver and being connected to the outdoor unit, and pointing the outdoor unit according to the received signal quality information.

13 Claims, 3 Drawing Sheets

(56) References Cited

U.S. PATENT DOCUMENTS

| | | | |
|---|---|---|---|
| 2009/0224988 A1* | 9/2009 | Park | H01Q 1/1257 343/703 |
| 2013/0127665 A1* | 5/2013 | Miller | H01Q 1/1257 342/359 |
| 2013/0271319 A1* | 10/2013 | Trerise | H01Q 1/125 342/359 |
| 2013/0271320 A1* | 10/2013 | Trerise | H01Q 1/125 342/359 |
| 2015/0106144 A1* | 4/2015 | Mangerson | G06Q 10/063114 705/7.15 |
| 2015/0120388 A1* | 4/2015 | Tan | G06F 3/016 705/7.32 |
| 2017/0026110 A1* | 1/2017 | Richardson | H01Q 1/1257 |

* cited by examiner

METHOD FOR THE INSTALLATION WITH AN ELECTRONIC DEVICE OF AN OUTDOOR UNIT AND ELECTRONIC DEVICE FOR SUCH AN INSTALLATION

CROSS-REFERENCE TO RELATED APPLICATIONS

This application claims priority to European Patent Application No. 14172444.3, filed Jun. 13, 2014, the entire content of which is incorporated herein by reference in its entirety.

FIELD

The present invention relates to a method for the installation of an outdoor unit (O.D.U), the installation being made with a single electronic device able to help the installer and to give appropriate information during different steps of the installation. The present invention also relates to the electronic device used during the installation. The invention also relates advantageously to reporting on the installation to a third party.

By "O.D.U", it should be understood all the elements that constitute what is commonly called a "satellite antenna"; these elements include a satellite dish (also called "antenna"), a Low Noise Converter—LNB, in some examples a transmitter—and various mechanical elements involved in pointing the satellite dish and the LNB.

The O.D.U cooperates with an indoor unit (I.D.U), which is either a satellite TV receiver or a modem, placed inside a house. The receiver allows the reception of television signals and displays them on a screen. Most of the time, the O.D.U and the I.D.U. are linked by a physical wire. This physical wire allows the transmission of signals emitted by a satellite and received by the O.D.U from the O.D.U to the I.D.U., and in some systems, this physical wire allows also the transmission of signals from the I.D.U. to the O.D.U and to the satellite.

BACKGROUND

Proper installation of a satellite dish remains a difficult operation for users. They often prefer to hire a professional installer. If a user wants to install his own O.D.U, the user often has to climb a ladder to fix the O.D.U in a suitable location of his/her dwelling. Smartphone Apps or Tools are available to help to choose a correct installation position and even roughly direct the dish to receive the satellite signals. For example, the smartphone indicates the elevation angle and azimuth direction to apply to the dish. Once the dish has been directed according to the smartphone's indications, the user has then to enter his home to check whether the signals are correctly received and transmitted to the I.D.U.

In most cases, the user has to make a number of return journeys to refine the positioning of the dish until the dish is in the correct position and supplies good signal quality. These operations make the installation of the O.D.U long and laborious. The use of acoustic signals which are provided in some cases at the O.D.U are so far not sufficiently accurate and sometimes not able to identify the correct satellite. This often results in the user returning between the O.D.U and the I.D.U. Satellite level meters inserted in the physical cable between the IDU and the ODU have the same disadvantages as the acoustic signal described above.

In addition, different operators clearly prefer the installation of O.D.U being performed by professional installer, so that the installation can be validated. If a malfunction occurs after proper installation of the antenna (such a malfunction can occur for different reasons, for example a fast growing vegetation which obscures the satellite signal from and the dish). If that installation has not been done by a professional installer, a remote technical assistance will lack information to help the user solve the problems on his own O.D.U.

SUMMARY

As aspect of the invention aims to remedy all or some of the disadvantages of the above identified background. An embodiment of the invention essentially makes the installation of O.D.U easy for all users, no returns between the O.D.U and the I.D.U. being necessary. An aspect of the invention aims to substitute the use of expensive analyzers when pointing an ODU usually used by professionals. Beneficially, an aspect of the invention also proposes to easily make a reporting of the installation which can then be used by the operators to validate the installation.

The reporting element of various embodiments of the invention allows system or network operators to have information relating to the original installation of the O.D.U and allows troubleshooting and monitoring actions to be performed.

A first aspect of the invention relates to a method for the installation of an outdoor unit, the outdoor unit for receiving signals from a satellite, the method comprising:
  on the electronic device determining the pointing information to be applied to the outdoor unit;
  receiving signal quality information on the electronic device and from an indoor unit, the indoor unit comprising a modem or receiver and being connected to the outdoor unit;
  pointing the outdoor unit according to the received signal quality information.

According to various embodiments, such a method of installation comprises one or more of the features below, which should be considered in any possible technical combinations:
  on the electronic device, determining the ideal installation position with a clear line of sight to the satellite;
  on the electronic device, determining the IDU configuration information based on previously programmed information and GPS coordinates;
  once the I.D.U. is configured correctly for installation mode, the I.D.U. will identify the correct satellite and pass this information to the electronic device;
  the method of installation comprises the step of configuring the I.D.U. in a correct installation mode;
  once the I.D.U. is configured correctly for installation mode, the I.D.U. identifies the correct satellite and passes this information to the electronic device.
  the signal quality information received by the electronic device is transmitted from the I.D.U. through a wireless link;
  the signal quality information received by the electronic device is transmitted from the I.D.U. through a wireless link established between the electronic device and a wireless device plugged onto the I.D.U;
  the pointing information to be applied to the outdoor unit is determined by the electronic device based on geographical position information obtained by a GPS module of the electronic device;
  the pointing information to be applied to the antenna is displayed by a graphical indication displayed on a screen of the electronic device, the graphical indication representing the antenna to be installed in the correct position;

the method of installation comprises the prior step of checking, within the electronic device, the operation of a wireless link between the electronic device and the indoor unit, and the operation of a GPS module of the electronic device;

the signal quality information is displayed on a screen of the electronic device as an instantaneous value of signal quality determined by the I.D.U., the signal being relevant for correctly positioning the O.D.U.;

the electronic device stores an optimum value of the signal quality during the step of the O.D.U positioning;

the signal quality information is restored by the electronic device as a sound signal whose frequency and/or pulse and/or intensity varies with the signal quality information;

the method of installation comprises a validation step of the outdoor unit installation including an operation consisting in comparing the signal quality information to a predetermined threshold value, the O.D.U installation being validated only if the threshold value is reached;

the I.D.U. use is disabled until the O.D.U installation is validated;

the comparison operation consists in comparing the signal quality to a minimum value, the installation of the O.D.U being validated only if the signal quality exceeds the minimum value;

the method of installation comprises the further step of transmitting from the electronic device to a data processing center, a set of information detailing the set of information dealing with the O.D.U installation is sent as secure electronic message. This message allows the verification of the semantic integrity;

the set of information dealing with the O.D.U installation comprises at least one picture of the installed antenna, the picture having been taken with the electronic device;

Another aspect of the invention relates to an electronic device for the implementation of the method according to the invention, the electronic device being used for the installation of an O.D.U comprising an antenna and a LNB, the electronic device comprising:

a device or processor for determining pointing information to be applied to the outdoor unit based on geographical positioning information obtained by a GPS module of the electronic device a device for receiving signal quality information transmitted from an I.D.U. comprising a modem or a receiver connected to the O.D.U to be installed.

The electronic device according to the invention is beneficially a smartphone or a tablet.

BRIEF DESCRIPTION OF THE FIGURES

Some embodiments of the present invention are now described, by way of example only, and with reference to the accompanying drawings, in which.

The same reference number represents the same element to the same type of element on all drawings, unless stated otherwise.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
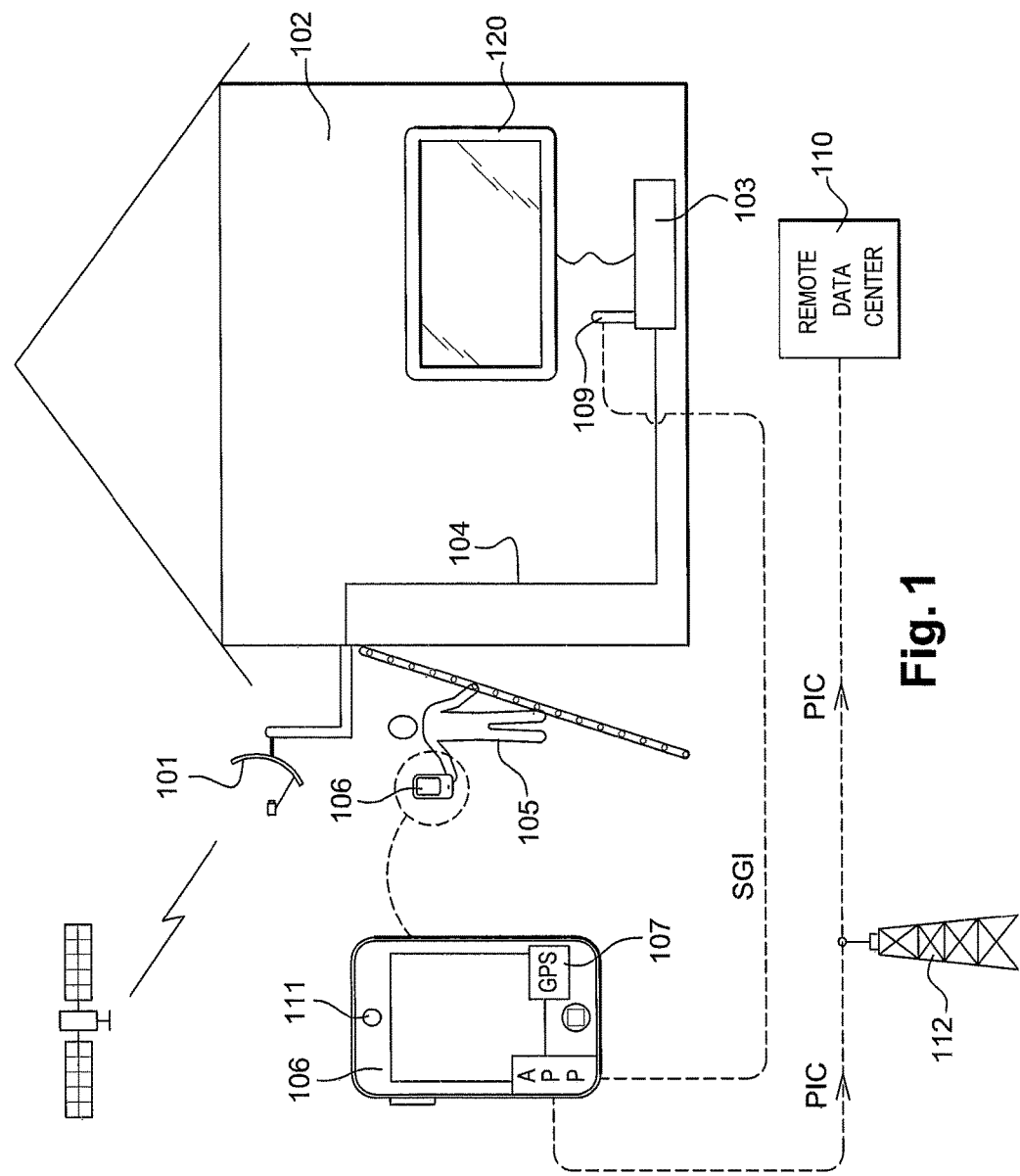
FIG. 1 is a schematic representation of different elements involved in the method according to an embodiment of the invention, and the exchanges between these elements.

Referring to FIG. 1, it is depicted a schematic representation of different elements involved in the method according to the invention, and the exchanges between these elements.

On this picture, an O.D.U 101 has to be installed on a house 102, typically on the wall of the house 102. The O.D.U 101 is linked to an I.D.U. 103 located inside the house and connected to a TV set 120 or a Personal Computer. The link between the O.D.U 101 and the I.D.U. 103 is a wire 104 that allows an exchange of information between these two units. In the case of a "Tooway" system, the exchange of information is bidirectional.

A user 105 wants to install the antenna on his dwelling. The user is equipped with an electronic device 106 which can be for example a smartphone, or a tablet, or any other electronic device comprising a screen and small enough to be easily brought up a ladder for example. Thus, in the embodiment, the electronic device 106 is a handlet that is easily transportable. A specific application APP is memorized in the electronic device 106 in order to achieve the described example of the invention. The electronic device 106 includes several physical or hardware components. For example, the electronic device 106 includes a physical processor, a screen and a memory (broadly termed "machine readable medium"). The memory includes specific machine executable instructions for carrying out the application APP, and in particular for carrying out one or more steps of the method according to the invention and also various feature(s) of the application APP. The physical processor is arranged to be in communication with the memory to execute the machine executable instructions. As a non-limiting example, the physical processor is configured to execute specific machine executable instructions for carrying out various checks (as described hereinafter), for determining the pointing information (including the various comparison and mathematical operations to determine the pointing information), for displaying or causing to display the various information (as described hereinafter, e.g. data, messages, graphs, . . . ), for transmitting or causing to transmit various data (as described hereinafter, e.g. data, commands, . . . ) and for processing various data (collected for example by its receiver/antenna and the GPS module).

Figure 2:
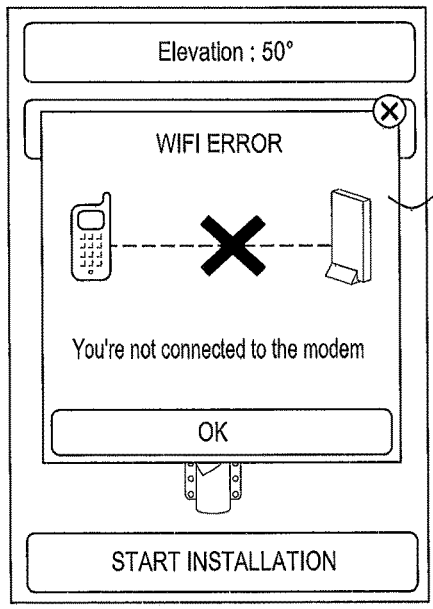
FIG. 2 is a first screenshot, corresponding to a step of the method according to an embodiment of the invention, of a screen of an electronic device used in the method according to an embodiment of the invention if there is no Wi Fi connection.
Figure 3:
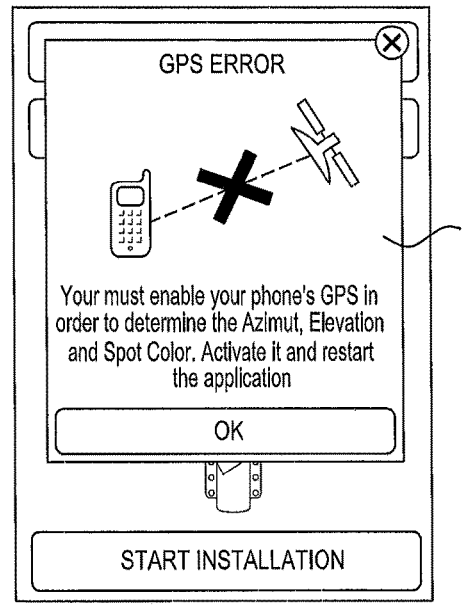
FIG. 3 is second screenshot, corresponding to a step of an embodiment of the method according to the invention, of the screen of the electronic device if there is no GPS information for the electronic device.

On the described example, the application proceeds with preliminary check operations: a first check consists in making sure that a wireless (wi-fi, blue tooth, or other . . . ) connection exists between the electronic device 106 and the I.D.U. 103, especially with the modem or receiver of the I.D.U. 103. If no connection is detected, an appropriate message 201 (FIG. 2) is displayed on the screen of the electronic device 106. A second check consists in making sure that a GPS module 107 of the electronic device 106 is working and can receive useful GPS information. If the GPS module 107 of the electronic device 106 is not working, an error message 301 (FIG. 3) is displayed on the screen of the electronic device 106. In accordance with an embodiment of the invention, the first and second checks can be conducted by the processor of the electronic device 106 in accordance with specific machine executable instructions.

Figure 4:
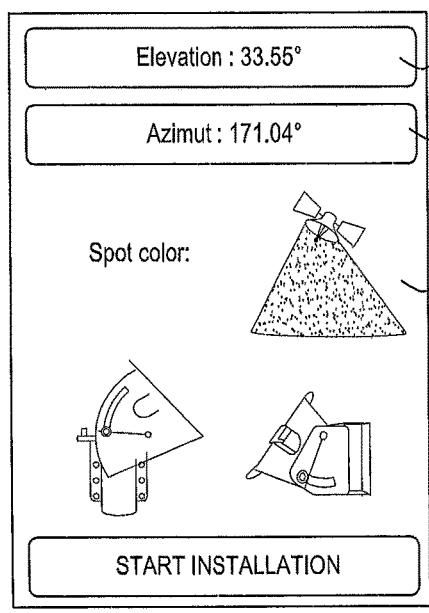
FIG. 4 is third screenshot, corresponding to a step of the method according to an embodiment of the invention, of the screen of the electronic device; this screen displays the pointing data for the ODU and a modem configuration.

Once the preliminary checks achieved, the user 105 gets through the GPS module 107 of the electronic device 106 a pointing information. The pointing information is determined by the electronic device 106 based on geographical position information obtained by the GPS module 107. In an embodiment of the invention, machine executable instructions are executed by the processor of the electronic device 106 to determine the pointing information. The pointing information is displayed on the screen of the electronic device 106 (FIG. 4). The pointing information determined by the processor gives a value for an elevation 401 and a value for an azimuth 402 to apply to the antenna of the O.D.U 101. To help the user 105 to correctly orientate the antenna, a graphical indication 403 is displayed on the screen of the electronic device 106, the graphical indication 403 showing the antenna to be installed in the correct position. In some embodiments, as shown on FIG. 4, two different kinds of antenna are represented, the user having the possibility to determine which represented antenna corresponds to the antenna he has to install. Simultaneously, an information 404 dealing with the appropriate spot to use for a certain transmitting VSAT system is also displayed on the screen of the electronic device 106.

In some embodiments, thanks to the specific application of the electronic device 106, the electronic device will configure the I.D.U. 103 in a correct installation mode. The following steps will occur:
ascertaining on which spot the electronic device 106 should program the I.D.U. 103; this information 404 is given by the electronic device 106;
sending a command from the electronic device 106 to the I.D.U. 103 in order to activate an installation mode on the I.D.U. 103,
sending a command from the electronic device 106 to the I.D.U. 103 in order to indicate to the modem or receiver which spot or coverage to choose, the spot defining the polarization and the frequency to look for during the installation of the O.D.U 101.

Figure 5:
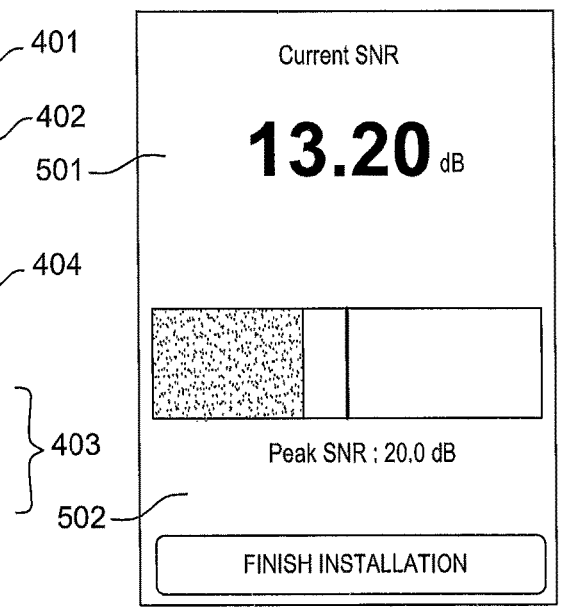
FIG. 5 is fourth screenshot, corresponding to a step of the method according to an embodiment of the invention, of the screen of the electronic device; this screen shot displays the current and Peak SNR values (Signal to Noise Ratio) displayed during the pointing of the antenna, and FIG. 6-A and FIG. 6-B are respectively a fifth and a sixth screenshot, corresponding to a step of the method according to an embodiment of the invention, of the screen of the electronic device; these screenshots confirm the successful delivery or failure to deliver the installation report.

When the user 105 starts to move the antenna, the user then instantaneously receives on the electronic device 106 a signal quality information SQI. On FIG. 5, this signal quality information is a signal quality giving a current SNR value 501 which is displayed on the screen of the electronic device 106. In other embodiments, the signal quality information SQI is not a signal to noise ratio, but a value which can correspond for example to CBER, VBER, MER, C/N, Power, dBm and dBu. The reception signal quality information SQI is transmitted by the I.D.U. 103 to the electronic device 106 by a wireless link 108; beneficially, the wireless link is established between the electronic device 106 and a wireless device 109 plugged onto the I.D.U. 103. The user 105 moves the antenna accordingly, pointing the O.D.U 101 according to the received signal quality information SQI.

Beneficially, the electronic device 106 stores an optimum value 502 of the signal quality during the O.D.U 101 pointing. Thus, if the user 105 keeps on moving the antenna after having reached the optimum value 502, the user knows that he/she can get again this optimum 502 value by moving back the antenna.

Beneficially, the reception signal quality information SQI is restored by the electronic device 106 as a sound signal whose frequency, pulse and/or intensity varies with the reception signal quality information.

In an embodiment, when the user thinks that he/she has completed the installation of the O.D.U 101, the user proceeds, through the electronic device 106, to a validation step. To this end, some data is sent from the electronic device 106 using the specific application to a remote data center 110.

More specifically, the following data can be transmitted from the electronic device to the remote data center:
the current value of the signal quality once the O.D.U 101 is no longer moved by the user 105;
some pictures PIC of the installation taken by a camera 111 of the electronic device 106; these pictures will notably allow the remote data center 110 to determine the reasons of a possible future failure;
the GPS location of the installation location.

The specific application APP can use a message, for example an e-mail to send through a cellular network this data to a remote data center 110. The data, and especially the current value of the signal quality will be compared to a predetermined threshold value, the O.D.U 101 installation being validated only if the threshold value is reached. In another embodiment, this comparison is computed in the electronic device 106 itself.

In some embodiments, the I.D.U. 103 use is disabled until the O.D.U 101 installation is validated. The message is secured and has a unique semantic integrity which is associated with the particular installation.

Figure 6A:
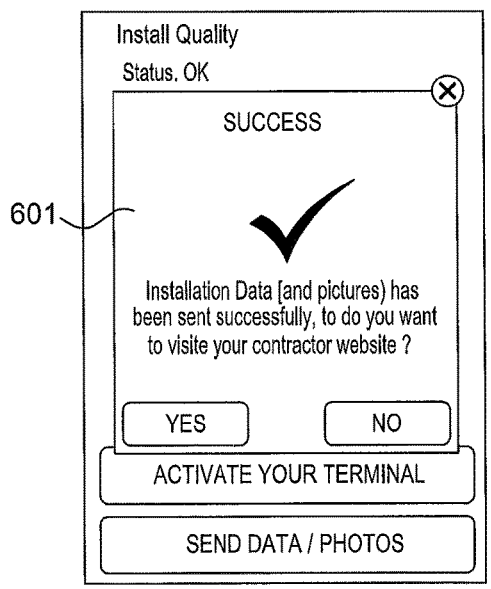
Figure 6B:
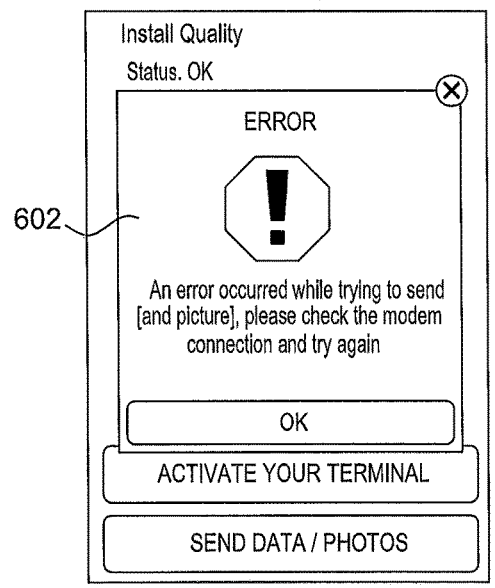

A message 601 of unsuccessful installation (FIG. 6-A), or if necessary a failure message 602 (FIG. 6-B) is then sent from the remote data center 110 to the electronic device 106.

It will be appreciated by one skilled in the art that the disclosed arrangements and methods described herein represent a solution to the technological problem currently faced by installers of a satellite dish.

Having described and illustrated the principles of the invention with reference to various embodiments, it will be recognized that the various embodiments can be modified in arrangement and detail without departing from such principles. It should be understood that the device(s), modules, processor(s), processes, or methods described herein described herein are not related or limited to any particular type of computing environment, unless indicated otherwise. Various types of specialized computing environments may be used with or perform operations in accordance with the teachings described herein. Elements of embodiments shown in software may be implemented in hardware and vice versa.

Execution of the sequences of machine instructions contained in a memory causes the processor or processing unit to perform at least some of the process steps or function(s) of the procedures described herein. One or more physical processors or physical processing units in a multi-processing arrangement may also be employed to execute the sequences of instructions contained in the memory or machine/computer readable medium. In alternative embodiments, hard-wired circuitry may be used in place of or in combination with software instructions.

The term "computer readable medium" or "machine readable medium" or "machine storage medium" or "memory" as used herein refers to any medium that participates in providing instructions to a processor or processing unit for execution. Such a medium is non-transitory and may take many forms, including but not limited to, non-volatile media, volatile media, and transmission media. Non-volatile media include, for example, optical or magnetic disks. Volatile media include dynamic memory. Transmission media include coaxial cables, copper wire and fiber optics. Common forms of computer/machine readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer/machine readable media may be involved in carrying one or more sequences of one or more instructions to processor for execution.

Computer programs comprising machine executable instructions for implementing at least one of the steps of the method described herein or function(s) of various elements of the structural arrangement can be implemented by one or more computers or computing modules comprising at least an interface, a physical processor and a non-transitory memory (also broadly referred to as a non-transitory machine readable or storage medium). The computer is a special purpose computer as it is programmed to perform specific steps of the method(s) described above. The non-transitory memory is encoded or programmed with specific code instructions for carrying out the above method(s) and its/their associated steps. The non-transitory memory may be arranged in communication with the physical processor or processing units so that the physical processor, in use, reads and executes the specific code instructions embedded in the non-transitory memory. The interface of the special purpose computer may be arranged in communication with the physical processor and receives input parameters that are processed by the physical processor.

The invention claimed is:

1. A method for installing an outdoor unit, the outdoor unit for receiving signals from a satellite, the method comprising:
   determining, with an electronic device, pointing information to be applied to the outdoor unit;
   receiving signal quality information on the electronic device from an indoor unit, the indoor unit comprising a modem or receiver and being connected to the outdoor unit;
   pointing the outdoor unit according to the received signal quality information;
   transmitting, from the electronic device to a data processing center, a set of information detailing the outdoor unit's installation, wherein the set of information comprises at least one picture of the installed outdoor unit, the picture having been taken with the electronic device; and
   performing, by a remote technical assistance, monitoring and troubleshooting activities using said set of information.

2. The method according to claim 1, further comprising configuring the indoor unit in a correct installation mode.

3. The method according to claim 1, wherein the signal quality information received by the electronic device is transmitted from the indoor unit through a wireless link.

4. The method according to claim 1, wherein the pointing information to be applied to the outdoor unit is determined by the electronic device based on geographical position information obtained by a GPS module of the electronic device.

5. The method according to claim 4, wherein the pointing information is applied to the outdoor unit and is displayed by a graphical indication on a screen of the electronic device, the graphical indication representing a generic or specific antenna to be installed in the correct position.

6. The method according to claim 1, further comprising checking, within the electronic device, an operation of a wireless link between said electronic device and the indoor unit, and an operation of a GPS module of said electronic device.

7. The method according to claim 1, further comprising displaying the signal quality information on a screen of the electronic device as an instantaneous value of a signal quality determined by the indoor unit, said signal being relevant for correctly positioning the outdoor unit.

8. The method according to claim 1, wherein the reception signal quality information is restored by the electronic device as a sound signal whose frequency and/or pulse and/or intensity varies with the reception signal quality information.

9. The method according to claim 1, further comprising validating the outdoor unit installation by comparing the signal quality information to a predetermined threshold value, the outdoor unit installation being validated only if the threshold value is reached.

10. The method according to claim 9, wherein the comparison operation consists in comparing the signal quality to a minimum value, the installation of the outdoor unit being validated only if the signal quality exceeds the minimum value.

11. The method according to claim 1, wherein the electronic device is a smartphone or a tablet.

12. The method according to claim 1, further comprising:
    responsive to the indoor unit being configured in the correct installation mode, receiving, at the electronic device from the indoor unit, information that correctly identifies a satellite.

13. An electronic device, said electronic device being used for installation of an outdoor unit comprising an antenna and a low noise converter (LNB), the electronic device comprising:

a processor for determining pointing information to be applied to the outdoor unit based on geographical pointing information obtained by a GPS module of the electronic device;

a device for receiving signal quality information transmitted from an indoor unit comprising a modem or a receiver connected to the outdoor unit to be installed, wherein the antenna is pointed according to the received signal quality information; and a device for transmitting to a data processing center a set of information detailing the outdoor unit's installation such that monitoring and troubleshooting activities are performed by a remote technical assistance using said set of information, wherein the set of information comprises at least one picture of the installed outdoor unit, the picture having been taken with the electronic device.

\* \* \* \* \*